US010980231B2

(12) United States Patent
Nakagawa

(10) Patent No.: US 10,980,231 B2
(45) Date of Patent: Apr. 20, 2021

(54) INSECT REPELLENT

(71) Applicant: Kao Corporation, Tokyo (JP)

(72) Inventor: Takao Nakagawa, Tokyo (JP)

(73) Assignee: Kao Corporation, Tokyo (JP)

( * ) Notice: Subject to any disclaimer, the term of this patent is extended or adjusted under 35 U.S.C. 154(b) by 0 days.

(21) Appl. No.: 16/195,065

(22) Filed: Nov. 19, 2018

(65) Prior Publication Data

US 2019/0082686 A1  Mar. 21, 2019

Related U.S. Application Data

(63) Continuation of application No. 15/551,782, filed as application No. PCT/JP2016/055255 on Feb. 23, 2016, now abandoned.

(30) Foreign Application Priority Data

Feb. 26, 2015 (JP) .................. 2015-036217

(51) Int. Cl.
| | | |
|---|---|---|
| A01N 37/10 | (2006.01) | |
| A01N 31/02 | (2006.01) | |
| A01N 31/04 | (2006.01) | |
| A01N 31/16 | (2006.01) | |
| A01N 37/02 | (2006.01) | |
| A01N 37/06 | (2006.01) | |
| A01N 37/08 | (2006.01) | |

(52) U.S. Cl.
CPC ............. *A01N 37/10* (2013.01); *A01N 31/02* (2013.01); *A01N 31/04* (2013.01); *A01N 31/16* (2013.01); *A01N 37/02* (2013.01); *A01N 37/06* (2013.01); *A01N 37/08* (2013.01)

(58) Field of Classification Search
CPC ........ A01N 31/02; A01N 37/08; A01N 31/04; A01N 31/16; A01N 37/02; A01N 37/10; A01N 37/06
USPC ........................................................ 514/532
See application file for complete search history.

(56) References Cited

U.S. PATENT DOCUMENTS

| | | | |
|---|---|---|---|
| 4,764,367 A | 8/1988 | Wilson et al. | |
| 5,855,903 A | 1/1999 | Warren et al. | |
| 6,280,751 B1* | 8/2001 | Fletcher | A61K 36/575 424/401 |
| 8,648,033 B2* | 2/2014 | Gaudin | C11B 9/0061 512/21 |
| 9,943,468 B2 | 4/2018 | Stevenson | |
| 10,779,531 B2* | 9/2020 | Nakagawa | A01N 43/40 |
| 2003/0138471 A1 | 7/2003 | Coats et al. | |
| 2004/0223998 A1 | 11/2004 | Iyer et al. | |
| 2007/0154504 A1* | 7/2007 | Coats | A01N 65/00 424/405 |
| 2012/0232160 A1 | 9/2012 | Kaufman et al. | |
| 2013/0011352 A1* | 1/2013 | Gaudin | C11B 9/0061 424/65 |
| 2016/0081890 A1 | 3/2016 | Stevenson | |
| 2018/0042225 A1* | 2/2018 | Nakagawa | A01N 37/08 |

FOREIGN PATENT DOCUMENTS

| | | |
|---|---|---|
| CN | 101214355 A | 7/2008 |
| JP | A H08-133909 | 5/1996 |
| JP | 2002-173407 A | 6/2002 |
| JP | 2004-196727 A | 7/2004 |
| JP | 2006-001864 A | 1/2006 |
| JP | 2009-530421 A | 8/2009 |
| JP | 2018-029836 A | 3/2018 |
| JP | 2018-035095 A | 3/2018 |
| WO | WO 94/03058 A1 | 2/1994 |
| WO | WO 2007/109736 A2 | 9/2007 |

OTHER PUBLICATIONS

Chaieb K, et al. (hytother Res. Jun. 2007;21(6):501-6, The chemical composition and biological activity of clove essential oil, Eugenia caryophyllata (Syzigium aromaticum L. Myrtaceae: a short review).*
Trongtokit, Y et al Phytother Res. Apr. 2005;19(4):303-9,Comparative repellency of 38 essential oils against mosquito bites).*
T. P. McGovern, Ladd, Jr. (Abstractor Journal of Economic Entomology, vol. 81, Issue 3, Jun. 1, 1988, pp. 826-829, https://doi.org/10.1093/jee/81.3.826).*
McQuate et al. (J Econ Entomol. Jun. 2004;97(3):862-70, Active ingredients in cade oil that synergize attractiveness of alpha-ionol to male Bactrocera latifrons (Diptera: Tephritidae).*
Rajindar K. Saini et al. (Journal of Chemical Ecology, 33, Article No. 985 (2007) , A 4-Alkyl-substituted Analogue of Guaiacol Shows Greater Repellency to Savannah Tsetse (*Glossina* spp.).*
McQuate, GT et al., "Active ingredients in cade oil that synergize attractiveness of α-ionol to male *Bactrocera latifrons* (Diptera: Tephritidae)," J Econ Entomol. Jun. 2004;97(3):862-70.
International Search Report (ISR) for PCT/JP2016/055255; I.A. fd: Feb. 23, 2016, dated Mar. 24, 2016 from the Japan Patent Office, Tokyo, Japan.
International Preliminary Report on Patentability (IPRP), Chapter I of the Patent Cooperation Treaty, including the Written Opinion for PCT/JP2016/055255; I.A. fd: Feb. 23, 2016, dated Aug. 29, 2017, by the International Bureau of WIPO, Geneva, Switzerland.
Xue, Feiqun et al, "Determination of repellency of aromatic carboxylic acid derivatives to housefly in relationship to quantitative structure activity," Scientia Agricultura Sinica (Zhongguo Nongye Kexue), 1997, vol. 30, No. 1, pp. 77-83, ISSN 0578-1752, Beijing, China.

(Continued)

*Primary Examiner* — Sabiha N Qazi
(74) *Attorney, Agent, or Firm* — Sterne, Kessler, Goldstein & Fox P.L.L.C.

(57) ABSTRACT

Provided is an insect repellent having excellent repellency and being highly safe. An insect repellent comprising, as an active ingredient, at least one selected from the group consisting of 2-methoxy-4-propylphenol, ethyl 2-cyclohexylpropionate, ethyl phenylacetate, 2,4,6-trimethyl-3-cyclohexene-1-methanol, 9-decen-1-ol, 1-octen-3-ol, 1-decanol, ethyl 2-ethylhexanoate, and trans-2-hexenyl acetate.

5 Claims, No Drawings

(56) References Cited

OTHER PUBLICATIONS

Leal et al., "Differential expression of olfactory genes in the southern house mosquito and insights into unique odorant receptor gene isoforms," Proc Natl Acad Sci U S A. Nov. 12, 2013;110(46):18704-9. doi: 10.1073/pnas.1316059110. Epub Oct. 28, 2013.
Vythilingam, I. et al., "Evaluation of carbon dioxide and 1-octen-3-ol as mosquito attractants," Southeast Asian J Trop Med Public Health, 23(2):328-331 (Jun. 1992).

\* cited by examiner

INSECT REPELLENT

FILED OF THE INVENTION

The present invention relates to an insect repellent having insect repellency.

BACKGROUND OF THE INVENTION

Most hematophagous insects cause infections among humans and animals via transmission of a pathogen, or cause skin inflammation. In particular, mosquitoes carry serious diseases, such as Dengue fever, Zika fever, yellow fever, encephalitis, and malaria, to humans, and are thus hygienically very harmful insects.

Such insects each have a sophisticated chemoreception system including a heat sensor to sense the body temperature of an animal, a taste receptor to sense taste, an olfactory receptor to sense volatile substances such as body odor, and a carbon dioxide receptor to sense carbon dioxide, which is a highly-volatile substance, and exhibit a wide variety of behaviors. For example, female mosquitoes before egg production are known to trace carbon dioxide expired by an animal and the body odor to approach the animal for the blood, detect the targeted animal by sensing the body temperature with the heat sensor, and suck the blood.

In recent years, a means to repel such insects by causing a change in the chemoreception system and disabling the cognitive sense of the insect has been devised. Substances acting on the olfactory receptor, such as N,N-diethyl-3-methylbenzamide (DEET) and p-menthane-3,8-diol (PMD), have been used as a repellent.

However, due to uncomfortable odor and high skin permeability, DEET has problem in that its use by infants and individuals with sensitive skin is restricted and the duration is only 2 to 3 hours.

It is reported that natural essential oils such as lemon eucalyptus oil, lemongrass oil, orange oil, and cassia oil have insect-repelling effect (e.g., Patent Literature 1). However, their repelling effect is not necessarily satisfactory, and thus insufficient for practical use.

[Patent Literature 1] JP-A-2002-173407

SUMMARY OF THE INVENTION

The present invention relates to the following 1) to 9).

1) An insect repellent comprising, as an active ingredient, at least one selected from the group consisting of 2-methoxy-4-propylphenol, ethyl 2-cyclohexylpropionate, ethyl phenylacetate, 2,4,6-trimethyl-3-cyclohexene-1-methanol, 9-decen-1-ol, 1-octen-3-ol, 1-decanol, ethyl 2-ethylhexanoate, and trans-2-hexenyl acetate.

2) A carbon dioxide response inhibitor for an insect, comprising, as an active ingredient, at least one selected from the group consisting of 2-methoxy-4-propylphenol, ethyl 2-cyclohexylpropionate, ethyl phenylacetate, 2,4,6-trimethyl-3-cyclohexene-1-methanol, 9-decen-1-ol, 1-octen-3-ol, 1-decanol, ethyl 2-ethylhexanoate, and trans-2-hexenyl acetate.

3) A method for repelling an insect, comprising applying at least one selected from the group consisting of 2-methoxy-4-propylphenol, ethyl 2-cyclohexylpropionate, ethyl phenylacetate, 2,4,6-trimethyl-3-cyclohexene-1-methanol, 9-decen-1-ol, 1-octen-3-ol, 1-decanol, ethyl 2-ethylhexanoate, and trans-2-hexenyl acetate onto the skin of a mammal.

4) A method for repelling an insect, comprising attaching or holding at least one selected from the group consisting of 2-methoxy-4-propylphenol, ethyl 2-cyclohexylpropionate, ethyl phenylacetate, 2,4,6-trimethyl-3-cyclohexene-1-methanol, 9-decen-1-ol, 1-octen-3-ol, 1-decanol, and ethyl 2-ethylhexanoate, trans-2-hexenyl acetate on an apparel article directly or indirectly contacting the skin.

5) A method for repelling an insect, comprising spreading at least one selected from the group consisting of 2-methoxy-4-propylphenol, ethyl 2-cyclohexylpropionate, ethyl phenylacetate, 2,4,6-trimethyl-3-cyclohexene-1-methanol, 9-decen-1-ol, 1-octen-3-ol, 1-decanol, ethyl 2-ethylhexanoate, and trans-2-hexenyl acetate in a defined space.

6) Use of at least one selected from the group consisting of 2-methoxy-4-propylphenol, ethyl 2-cyclohexylpropionate, ethyl phenylacetate, 2,4,6-trimethyl-3-cyclohexene-1-methanol, 9-decen-1-ol, 1-octen-3-ol, 1-decanol, ethyl 2-ethylhexanoate, and trans-2-hexenyl acetate for producing an insect repellent.

7) Use of at least one selected from the group consisting of 2-methoxy-4-propylphenol, ethyl 2-cyclohexylpropionate, ethyl phenylacetate, 2,4,6-trimethyl-3-cyclohexene-1-methanol, isocyclocitral, 9-decen-1-ol, 1-octen-3-ol, 1-decanol, ethyl 2-ethylhexanoate, and trans-2-hexenyl acetate for producing a carbon dioxide response inhibitor for an insect.

8) Use of at least one compound selected from the group consisting of 2-methoxy-4-propylphenol, ethyl 2-cyclohexylpropionate, ethyl phenylacetate, 2,4,6-trimethyl-3-cyclohexene-1-methanol, 9-decen-1-ol, 1-octen-3-ol, 1-decanol, ethyl 2-ethylhexanoate, and trans-2-hexenyl acetate for repelling an insect.

9) Use of at least one compound selected from the group consisting of 2-methoxy-4-propylphenol, ethyl 2-cyclohexylpropionate, ethyl phenylacetate, 2,4,6-trimethyl-3-cyclohexene-1-methanol, 9-decen-1-ol, 1-octen-3-ol, 1-decanol, ethyl 2-ethylhexanoate, and trans-2-hexenyl acetate for inhibiting the carbon dioxide response of an insect.

DETAILED DESCRIPTION OF THE INVENTION

The present invention relates to providing an insect repellent having excellent repellency and being highly safe.

The present inventors searched for a material capable of inhibiting the nerve response of an insect to a carbon dioxide stimulus by using an electrophysiological method, and found that specific fragrance compounds have excellent carbon dioxide response-inhibiting activity, and are thus useful for an insect repellent.

The present invention can provide an insect repellent which exhibits excellent repelling effect by inhibiting the carbon dioxide response of an insect, differs in a mechanism from those of common repellents such as DEET and PMD, and is highly safe.

Each of 2-methoxy-4-propylphenol, ethyl 2-cyclohexylpropionate, ethyl phenylacetate, 2,4,6-trimethyl-3-cyclohexene-1-methanol, 9-decen-1-ol, 1-octen-3-ol, 1-decanol, ethyl 2-ethylhexanoate, and trans-2-hexenyl acetate in the present invention (hereinafter, also referred to as "the compound according to the present invention") is a compound known as a fragrance, and commercially available as follows.
- 2-methoxy-4-propylphenol: Sigma-Aldrich Co., LLC.
- 9-decen-1-ol: Sigma-Aldrich Co., LLC.
- 1-octen-3-ol: Sigma-Aldrich Co., LLC.
- 1-decanol: Sigma-Aldrich Co., LLC.
- ethyl 2-ethylhexanoate (IROTYL): Kao Corporation
- trans-2-hexenyl acetate: Sigma-Aldrich Co., LLC.
- ethyl 2-cyclohexylpropionate (POIRENATE): Kao Corporation
- ethyl phenylacetate: Tokyo Chemical Industry Co., Ltd.
- 2,4,6-trimethyl-3-cyclohexene-1-methanol (isocyclogeraniol): International Flavors & Fragrances (IFF) Inc.

In the present invention, one of these compounds may be used singly, or two or more thereof may be used in a mixture.

The insect intended in the present invention is not limited and may be any insect having a carbon dioxide reception response system, and the insect may be hematophagous or non-hematophagous. Example of such insects include mosquitoes (female) such as northern house mosquitoes, *Culex tritaeniorhynchus*, yellow fever mosquitoes, Asian tiger mosquitoes, and Chinese malaria mosquitoes; flies such as houseflies, false stable flies, little house flies, blow flies, flesh flies, seed-corn flies, onion flies, fruit flies, vinegar flies, moth flies, and tsetse flies; horseflies; black flies; stable flies; biting midges; and chironomids. Among them, mosquitos, flies, black flies, and stable flies are preferred.

As demonstrated in Examples later, the compound according to the present invention inhibits the carbon dioxide response of an Asian tiger mosquito at a neural level to inhibit the seeking behavior of the mosquito for the human body. Thus, the compound according to the present invention can serve as an insect repellent or carbon dioxide response inhibitor for an insect (hereinafter, simply referred to as "carbon dioxide response inhibitor"), and can be used for producing an insect repellent or carbon dioxide response inhibitor. In other words, the compound according to the present invention can be used for repelling an insect and inhibiting the carbon dioxide response.

Here, "repelling an insect" refers to preventing an insect from approaching to an object or forcing an insect to avoid an object, and "inhibiting the carbon dioxide response of an insect" refers to inhibiting the seeking behavior of an insect for a carbon dioxide source by disabling or reducing the carbon dioxide reception response of the insect to inhibit the cognitive sense to the carbon dioxide, and the concept differs from having insecticidal ability to exterminate an insect.

The carbon dioxide response of an insect can be measured through investigation of a nerve firing pattern of the sensory hair with electrodes inserted therein in response to a carbon dioxide stimulus by using known single sensillum recording (Nature 461, 277-281 (10 Sep. 2009)).

The insect repellent or carbon dioxide response inhibitor according to the present invention can repel an insect, for example, through applying it onto the skin of a mammal such as a human, allowing it to attach or be held on an apparel article directly or indirectly contacting the skin, such as a cloth and an accessory, or spreading (including evaporating and volatilizing) it in a defined space such as a room interior and a car interior, and can be appropriately blended with additional components such as a solvent and an additive for formulation into a composition to prepare a formulation. Alternatively, the insect repellent or carbon dioxide response inhibitor according to the present invention may be used for a material for imparting insect repellency to an external preparation for cutaneous administration, a cleaning agent, a skin cosmetic, a hair cosmetic, a textile softener, a fabric treatment agent, or the like.

The quantity of the compound according to the present invention to be blended in the above composition is preferably 0.001% by mass or more, more preferably 0.01% by mass or more, even more preferably 0.1% by mass or more and preferably 80% by mass or less, more preferably 40% by mass or less, even more preferably 10% by mass or less, or preferably from 0.001 to 80% by mass, more preferably from 0.01 to 40% by mass, even more preferably from 0.01 to 10% by mass, and further more preferably from 0.1 to 10% by mass, relative to the total quantity of the composition, although it varies depending on the dosage form.

The type of a solvent or additive may be appropriately selected in accordance with the mode of use or intended use of the insect repellent or carbon dioxide response inhibitor, and examples of the solvent include lower alcohols such as methanol, ethanol, and propanol; and water.

Examples of the additive include additives commonly used for various chemical products and cosmetics, specifically, surfactants, organic solvents, oily components, moisturizing agents, powders, solubilizers, thickeners, resins, cleaning agents, preservatives, UV absorbers, inorganic substances, fragrances, pigments, deodorants, essential oils, pharmaceutical agents, plant extracts, and other repellents.

The dosage form of the insect repellent or carbon dioxide response inhibitor according to the present invention can be appropriately set in accordance with the mode of use, and may be any of a liquid, a cream, a lotion, an emulsion, a gel, an ointment, a powder, a granule, a spray, and an aerosol spray, etc.

In the case that the insect repellent or carbon dioxide response inhibitor according to the present invention is spread in a defined space, it is suitable to employ a method in which the insect repellent or carbon dioxide response inhibitor supported on a carrier or dissolved in a solvent is packed in a container with a liquid-absorbing wick and heated or evaporated through air blow, or a method in which the insect repellent or carbon dioxide response inhibitor supported on a carrier is evaporated into the space at normal temperature. In this case, examples of carriers to support the insect repellent or carbon dioxide response inhibitor include natural fibers such as pulp, cotton, wool, linen, and silk; synthetic fibers such as polypropylene, polyethylene, polyamide, polyethylene terephthalate, polybutylene terephthalate, polysulfone, rayon, methacrylic resin, and glass fiber; and porous materials such as zeolite, talc, white carbon, diatomaceous earth, lime, silica gel, and activated carbon.

Examples of the method for allowing the insect repellent or carbon dioxide response inhibitor according to the present invention to attach or be held on an apparel article include a method in which the insect repellent or carbon dioxide response inhibitor is applied onto an intended article, a method in which the insect repellent or carbon dioxide response inhibitor is blended in a textile softener and allowed to attach or be held in treatment with the softener, and a method in which a fabric base material which has been treated with the insect repellent or carbon dioxide response inhibitor in advance to impart insect repellency is used for production of an intended article.

In relation to the above-described embodiments, the following modes are disclosed in the present invention.

<1> An insect repellent comprising, as an active ingredient, at least one selected from the group consisting of 2-methoxy-4-propylphenol, ethyl 2-cyclohexylpropionate, ethyl phenylacetate, 2,4,6-trimethyl-3-cyclohexene-1- methanol, 9-decen-1-ol, 1-octen-3-ol, 1-decanol, ethyl 2-ethylhexanoate, and trans-2-hexenyl acetate.

<2> A carbon dioxide response inhibitor for an insect, comprising, as an active ingredient, at least one selected from the group consisting of 2-methoxy-4-propylphenol, ethyl 2-cyclohexylpropionate, ethyl phenylacetate, 2,4,6-trimethyl-3-cyclohexene-1-methanol, 9-decen-1-ol, 1-octen-3-ol, 1-decanol, ethyl 2-ethylhexanoate, and trans-2-hexenyl acetate.

<3> The insect repellent according to <1> or the carbon dioxide response inhibitor for an insect according to <2>, for at least one insect selected from the group consisting of mosquitoes, flies, black flies, and stable flies.

<4> The insect repellent or carbon dioxide response inhibitor for an insect according to <3>, wherein the insect is a mosquito.

<5> A method for repelling an insect, comprising applying at least one selected from the group consisting of 2-methoxy-4-propylphenol, ethyl 2-cyclohexylpropionate, ethyl phenylacetate, 2,4,6-trimethyl-3-cyclohexene-1-methanol, 9-decen-1-ol, 1-octen-3-ol, 1-decanol, ethyl 2-ethylhexanoate, and trans-2-hexenyl acetate onto the skin of a mammal.

<6> Use of at least one selected from the group consisting of 2-methoxy-4-propylphenol, ethyl 2-cyclohexylpropionate, ethyl phenylacetate, 2,4,6-trimethyl-3-cyclohexene-1-methanol, 9-decen-1-ol, 1-octen-3-ol, 1-decanol, ethyl 2-ethylhexanoate, and trans-2-hexenyl acetate for producing an insect repellent.

<7> Use of at least one selected from the group consisting of 2-methoxy-4-propylphenol, ethyl 2-cyclohexylpropionate, ethyl phenylacetate, 2,4,6-trimethyl-3-cyclohexene-1-methanol, isocyclocitral, 9-decen-1-ol, 1-octen-3-ol, 1-decanol, ethyl 2-ethylhexanoate, and trans-2-hexenyl acetate for producing a carbon dioxide response inhibitor for an insect.

<8> Use of at least one compound selected from the group consisting of 2-methoxy-4-propylphenol, ethyl 2-cyclohexylpropionate, ethyl phenylacetate, 2,4,6-trimethyl-3-cyclohexene-1-methanol, 9-decen-1-ol, 1-octen-3-ol, 1-decanol, ethyl 2-ethylhexanoate, and trans-2-hexenyl acetate for repelling an insect.

<9> Use of at least one compound selected from the group consisting of 2-methoxy-4-propylphenol, ethyl 2-cyclohexylpropionate, ethyl phenylacetate, 2,4,6-trimethyl-3-cyclohexene-1-methanol, 9-decen-1-ol, 1-octen-3-ol, 1-decanol, ethyl 2-ethylhexanoate, and trans-2-hexenyl acetate for inhibiting the carbon dioxide response of an insect.

<10> The insect repellent or carbon dioxide response inhibitor for an insect according to <1> to <4>, wherein the content of the active ingredient in the composition is preferably 0.001% by mass or more, more preferably 0.01% by mass or more, even more preferably 0.1% by mass or more and preferably 80% by mass or less, more preferably 40% by mass or less, even more preferably 10% by mass or less, or preferably from 0.001 to 80% by mass, more preferably from 0.01 to 40% by mass, even more preferably from 0.01 to 10% by mass, and further more preferably from 0.1 to 10% by mass.

<11> A method for repelling an insect, comprising attaching or holding at least one selected from the group consisting of 2-methoxy-4-propylphenol, ethyl 2-cyclohexylpropionate, ethyl phenylacetate, 2,4,6-trimethyl-3-cyclohexene-1-methanol, 9-decen-1-ol, 1-octen-3-ol, 1-decanol, and ethyl 2-ethylhexanoate, trans-2-hexenyl acetate on an apparel article directly or indirectly contacting the skin.

<12> A method for repelling an insect, comprising spreading at least one selected from the group consisting of 2-methoxy-4-propylphenol, ethyl 2-cyclohexylpropionate, ethyl phenylacetate, 2,4,6-trimethyl-3-cyclohexene-1-methanol, 9-decen-1-ol, 1-octen-3-ol, 1-decanol, ethyl 2-ethylhexanoate, and trans-2-hexenyl acetate in a defined space such as a room interior and a car interior.

EXAMPLES

Example 1: Reference Example: Evaluation of Carbon Dioxide Response-Inhibiting Effect In accordance with a method described in a literature (Nature 461, 277-281 (10 Sep. 2009)), evaluation was performed as follows.

(1) Preparation of Asian Tiger Mosquitoes

Asian tiger mosquitoes grown from eggs purchased from Sumitomo Technoservice Corporation were used. A transparent plastic pan is filled with water to a depth of approximately 1 cm, and a filter paper on which the eggs had been deposited was put therein. The larvae were fed with tropical fish feed (TetraMin) every day. After approximately 1 week, the pupae were collected with a dropper, and transferred into a 20 mL plastic cup, and the cup was placed in a netted cage. The adults were fed with 10% by mass of sucrose contained in a 25 mL plastic tube. The males and females were kept together in one cage and allowed to mate for 5 days after eclosion. After 5 days of captivity, the adults were collected with an insect aspirator and anesthetized on ice for 5 minutes, and visually sorted into males and females to collect only the females. The wings and legs were removed from each female mosquito under anesthesia, and the female mosquito was pushed onto a double-sided adhesive tape pasted on a microscope slide with the back on the tape and thus fixed thereto, and the antennae and maxillary palpi were positioned so as to achieve the accessibility of electrodes.

(2) Preparation of Electrodes for Recording Nerve Response

A 1 mol/L aqueous solution of potassium hydroxide was injected into a 50 mL syringe, and the syringe was horizontally fixed to a magnet stand with a clamp. A tungsten wire fixed to an electrode holder was horizontally inserted into the syringe, and polished by electrolysis under microscopic observation. A current was supplied from an AC power source to the syringe through the electrode holder via crocodile clips.

(3) Recording of Nerve Response

The Asian tiger mosquito prepared on a microscope slide was set under a microscope, and positioned so that the antennae were at the center of the view through a ×10 objective lens. A reference electrode was inserted in the eye of the insect. A pipette for providing an olfactory stimulus was placed near the maxillary palpi, and the objective lens was replaced with a ×100 objective lens. The recording electrode was brought close to the sensory hair, and carefully inserted into the sensory hair with a micromanipulator. The peg-like shape of the carbon dioxide-sensitive sensory hair of an Asian tiger mosquito can be confirmed under microscopic observation. After insertion of the electrode into the sensory hair, the spontaneous nerve firing pattern was investigated. Carbon dioxide the concentration of which had been adjusted to 0.1% was fed to an olfactory stimulation apparatus via a silicone tube to stimulate the maxillary palpi for 1 second, and the carbon dioxide response was investigated.

(4) Evaluation of Carbon Dioxide Response-Inhibiting Effect

The concentration of each of the fragrances listed in Table 1 was adjusted to 1% with paraffin oil, and the resultant was used as a sample. On a filter paper (3 mm×50 mm) 15 µL of the sample was dropped, and the filter paper was inserted in a Pasteur pipette. The Pasteur pipette was connected to a stimulation apparatus via a plastic tube, and olfactory stimulation was performed for 1 second while the response to carbon dioxide in the air was monitored, and the carbon dioxide response-inhibiting effect was evaluated. The number of nerve firings in 1 second after stimulation with paraffin oil as a solvent and the number of nerve firings in 1 second after stimulation with each sample were counted, and the ratio was used for evaluation of the response-inhibiting effect (N=1).

Inhibitory rate (%)=100×([number of firings after stimulation with paraffin oil−number of firings after stimulation with sample]/[number of firings after stimulation with paraffin oil])  (Equation 1)

Table 2 shows the results. The compounds according to the present invention inhibited the carbon dioxide response of an Asian tiger mosquito at a neural level.

TABLE 1

| Name | Distributor |
| --- | --- |
| 2-Methoxy-4-propylphenol | SIGMA-ALDRICH CO., LLC. |
| 9-Decen-1-ol | SIGMA-ALDRICH CO., LLC. |
| 1-Octen-3-ol | SIGMA-ALDRICH CO., LLC. |
| 1-Decanol | SIGMA-ALDRICH CO., LLC. |
| Ethyl 2-ethylhexanoate ("IROTYL" (R)) | Kao Corporation |
| trans-2-Hexenyl acetate | SIGMA-ALDRICH CO., LLC. |
| Ethyl 2-cyclohexylpropionate ("POIRENATE") (R) | Kao Corporation |
| Ethyl phenylacetate | Tokyo Chemical Industry Co., Ltd. |
| 2,4,6-Trimethyl-3-cyclohexene-1-methanol | IFF INC. |

Example 2: Evaluation of Inhibition of Seeking Behavior of Mosquito for Human Arm Mosquitoes were prepared for evaluation in the same manner as in Example 1. Approximately 150 to 200 female Asian tiger mosquitoes were transferred in a plastic cage (30×30×30 cm). The plastic cage had a hole to put the arm inside in only one side, and the arm was inserted through the hole in an attraction test. The other three sides were covered with a net, preventing a smell from remaining in the box. A breathable sheet for disposable diapers (air permeance (JIS P8117): 2 sec/300 mL·32 sheets or higher, water vapor transmission rate (JIS Z0208): 1 g/100 cm$^2$·1 hr or higher) was cut into a size of 6 cm×6 cm, and the resultant was fixed with a tape to the inner side of a Qualatex glove (AS ONE 8-4053-02) cut in 5 cm×5 cm, and 30 mL of an evaluation sample, the concentration of which had been adjusted to 0.1 vol % with ethanol, was uniformly applied onto the breathable sheet. After the application, the resultant was left to stand for approximately 5 minutes, and the attraction test was conducted. The arm was covered with the Qualatex glove provided with the breathable sheet, and inserted in the plastic cage. After the insertion, the number of mosquitoes which landed on the breathable sheet in 5 minutes was counted. In the case that a mosquito landed a plurality of times, all of the landings were counted. In view of the influence of a sample on the mosquitoes, the test was conducted just four times in one cage, and the cage was then replaced with another cage and other mosquitoes were used for the subsequent tests. The inhibitory rate relative to the number of landings with application of ethanol solvent only was calculated to determine the inhibitory effect.

Inhibitory rate (%)=100×(1−[number of landings with application of sample]/[number of landings with application of ethanol])  (Equation 2)

Table 2 shows the results in combination. The compounds according to the present invention exhibited excellent inhibitory effect for an Asian tiger mosquito.

TABLE 2

| Sample | Inhibition of carbon dioxide response (%) | Inhibitory rate (%) |
| --- | --- | --- |
| 2-Methoxy-4-propylphenol | 95 | 100 |
| 9-Decen-1-ol | 56 | 93.5 |
| 1-Octen-3-ol | 55 | 70.5 |
| 1-Decanol | 54 | 97.5 |
| Ethyl 2-ethylhexanoate | 51 | 66 |
| trans-2-Hexenyl acetate | 48 | 54 |
| Ethyl 2-cyclohexylpropionate | 48 | 58 |
| Ethyl phenylacetate | 79 | 38.5 |
| 2,4,6-Trimethyl-3-cyclohexene-1-methanol | 61 | 89 |

What is claimed is:

1. A method for repelling an insect, comprising applying, to the skin of a mammal a composition that comprises 0.001% to 80% by mass of 2-methoxy-4-proplyphenol.

2. The method of claim 1, wherein the mammal is a human.

3. The method of claim 1, wherein the insect is a mosquito or fly.

4. The method of claim 1, wherein the insect is a fly and the fly is a black fly or stable fly.

5. The method of claim 1, wherein the insect is a mosquito.

* * * * *